(12) United States Patent
Webb et al.

(10) Patent No.: US 8,175,141 B2
(45) Date of Patent: May 8, 2012

(54) METHOD AND APPARATUS FOR CALIBRATING EQUALIZERS WITHOUT KNOWLEDGE OF THE DATA PATTERN BEING RECEIVED

(75) Inventors: Christopher Webb, Campbell, CA (US); Dmitri Stukalov, Palo Alto, CA (US)

(73) Assignee: Computer Access Technology Corporation, Santa Clara, CA (US)

( * ) Notice: Subject to any disclaimer, the term of this patent is extended or adjusted under 35 U.S.C. 154(b) by 773 days.

(21) Appl. No.: 11/894,181

(22) Filed: Aug. 20, 2007

(65) Prior Publication Data

US 2009/0052515 A1 Feb. 26, 2009

(51) Int. Cl.
*H03H 7/30* (2006.01)
(52) U.S. Cl. ........................................ 375/229; 375/316
(58) Field of Classification Search .................. 375/229, 375/232–233, 316
See application file for complete search history.

(56) References Cited

U.S. PATENT DOCUMENTS

| | | | | |
|---|---|---|---|---|
| 4,486,739 | A | | 12/1984 | Franaszek et al. |
| 5,434,883 | A | * | 7/1995 | Kimoto et al. ................ 375/231 |
| 5,539,774 | A | | 7/1996 | Nobakht et al. |
| 6,016,379 | A | * | 1/2000 | Bulow .......................... 385/147 |
| 6,215,818 | B1 | * | 4/2001 | Velez et al. ................... 375/233 |
| 7,079,586 | B1 | * | 7/2006 | Adireddy et al. ............. 375/285 |
| 7,233,616 | B1 | * | 6/2007 | Nayler .......................... 375/231 |
| 7,446,622 | B2 | * | 11/2008 | Chiang .......................... 333/18 |
| 2002/0122503 | A1 | * | 9/2002 | Agazzi .......................... 375/316 |
| 2002/0181573 | A1 | * | 12/2002 | Dohmen et al. .............. 375/229 |
| 2003/0063663 | A1 | * | 4/2003 | Bryant .......................... 375/229 |
| 2004/0198296 | A1 | * | 10/2004 | Hui et al. ...................... 455/296 |
| 2004/0257954 | A1 | * | 12/2004 | Ohkubo et al. ............ 369/59.21 |
| 2005/0169412 | A1 | * | 8/2005 | Yang et al. .................... 375/350 |
| 2005/0193318 | A1 | * | 9/2005 | Okumura et al. ............. 714/795 |
| 2005/0213241 | A1 | * | 9/2005 | Cideciyan et al. ............. 360/65 |
| 2005/0259728 | A1 | * | 11/2005 | Nieto ............................ 375/233 |
| 2006/0188043 | A1 | * | 8/2006 | Zerbe et al. ................... 375/346 |
| 2006/0274861 | A1 | * | 12/2006 | Langenbach et al. ......... 375/341 |
| 2007/0283220 | A1 | * | 12/2007 | Kim .............................. 714/758 |
| 2008/0107165 | A1 | * | 5/2008 | Nicolescu et al. ............ 375/232 |

OTHER PUBLICATIONS

Widrow, et al., "Adaptive Signal Processing", *Prentice Hall*, (1985),247-249.

* cited by examiner

*Primary Examiner* — Emmanuel Bayard
(74) *Attorney, Agent, or Firm* — Gordon Kessler

(57) ABSTRACT

A method and apparatus for calibrating an equalizer. The method comprises the steps of defining one or more equalization parameters and calculating a bit error rate of a signal for one or more values of a first of the one or more equalization parameters by counting at least one of running disparity errors and incorrect symbol errors. A value for the first of the one or more equalization parameters which provides the lowest bit error rate is set.

21 Claims, 4 Drawing Sheets

METHOD AND APPARATUS FOR CALIBRATING EQUALIZERS WITHOUT KNOWLEDGE OF THE DATA PATTERN BEING RECEIVED

BACKGROUND OF THE INVENTION

When transmitting high speed serial data over non-ideal communication channels, many environments experience signal attenuation and reflections caused by impedance mismatches. It's common practice to use a combination of equalization schemes such as linear equalizers and Decision Feedback Equalizers (DFE) to compensate for these effects. In many environments, the non-ideal nature of these channels can be measured or modeled to aid in determining which equalization settings will provide the best compensation. In many other environments, however, the non-ideal nature of these channels can not be measured or modeled. In these environments, the equalization settings cannot be precalculated to their optimal values. These environments require dynamic programming of the equalization settings based on real time analysis of either the environment, or of the recoverability of the traffic.

Others have attempted to solve this problem in a number of different ways. First, R. W. Lucky of Bell Labs introduced a process in 1965 for being able to equalize a signal without any prior knowledge of the transmitted signal. The process is described in a textbook ADAPTIVE SIGNAL PROCESSING by Widrow and Stearns, published in 1985 by Prentice Hall (pages 247-249). The process is known as decision-directed learning. This process, however, uses quantizers to adjust necessary equalization procedures. U.S. Pat. No. 5,539,774 describes a method for using a least mean squares process for determining an error rate, and then adjusting the equalizer parameters.

Neither of these methods, however, solves the problem in the manner contemplated in accordance with the present invention.

SUMMARY OF THE INVENTION

In accordance with the invention, a method and apparatus are provided for using error detection, which can be determined solely through decoding of 10 bit symbols (such as disclosed in U.S. patent application No. 4,486,739, issued Jun. 30, 1982 to Franaszek, entitled "Byte Oriented DC Balanced (0,4) 8 B/10 B Partitioned Block Transmission Code), as a means to calibrate equalizers of a serial receiver where the traffic received by the serial receiver is not predetermined. This method and apparatus could also be extended to other encoding schemes such as 64 b/66 b encoding and the like.

The inventor of the present invention has noted the following with respect to other presently available solutions in the industry to set equalizer settings.

If the communication channel is known, the entire channel can be measured and S parameters extracted from those measurements. Once these S parameters are known, a simulation environment can be created to model the high frequency response of the channel, and the effects of equalization at the receiver. Multiple simulations may then be run to determine the effects of the equalization to the signal eye at the receiver, and the equalization setting that provides the largest opening for the eye can be determined. These equalization settings may then be applied to the hardware at the receiving circuitry.

The transmitting device could be put in a specific test mode which generates a known and repeating traffic pattern such as a compliance pattern or PRBS pattern. Since these patterns are repeating, the receiving device could correlate the expected traffic to the received traffic. The receiving device could then perform bit error rate measurements based on a complete 10 bit comparison of data received versus data expected. Equalization settings could then be attempted to reduce the bit error rate, and the setting which creates the lowest bit error rate would be chosen.

The receiving device could contain circuitry that allows it to measure the eye height and width. This measurement circuitry would be applied after the equalization is performed to see what effects the equalization has to the eye measurement. Increases in the height of the eye, increases to the width of the eye, or even increases in total area of the eye can be used to determine positive effects of the equalization setting.

However, each of these solutions requires either some level of knowledge of the transmission channel, use of repetitive and predetermined traffic, or complicated eye measurement circuitry. It is the present invention that allows proper equalization without having knowledge of the incoming signal or transmission channel characteristics.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The preferred embodiments of the method and apparatus of the present invention will now be described making reference to the following figures. The method and apparatus provided in accordance with the invention allows for calibration of one or more equalization settings for an unknown communication channel environment. Furthermore, this invention does not require exact knowledge of the data pattern being received to perform this analysis. It is assumed that the serial protocol being transmitted has been encoded using a standard 8 B/10 B encoding scheme. This encoding scheme provides a finite amount of error detection capability through determination of incorrect running disparity and/or invalid 10 bit symbols. Of course, the invention would be equally applicable to other encoding schemes having similar characteristics.

Determination of bit error rate by monitoring running disparity and invalid 10 bit symbols cannot catch all cases of transmission errors. In particular, some bit errors may transform the original 10 bit symbol into another valid 10 bit symbol with proper running disparity. However, a relative bit error rate can be established using these means. It is not critical to measure the exact bit error rate for the purpose of calibration. It is critical however, to measure the relative bit error rate. Thus, in accordance with the invention, the comparison of relative bit error rates are used to determine if a new calibration setting has made a positive or negative impact on the communication reliability.

Figure 1:
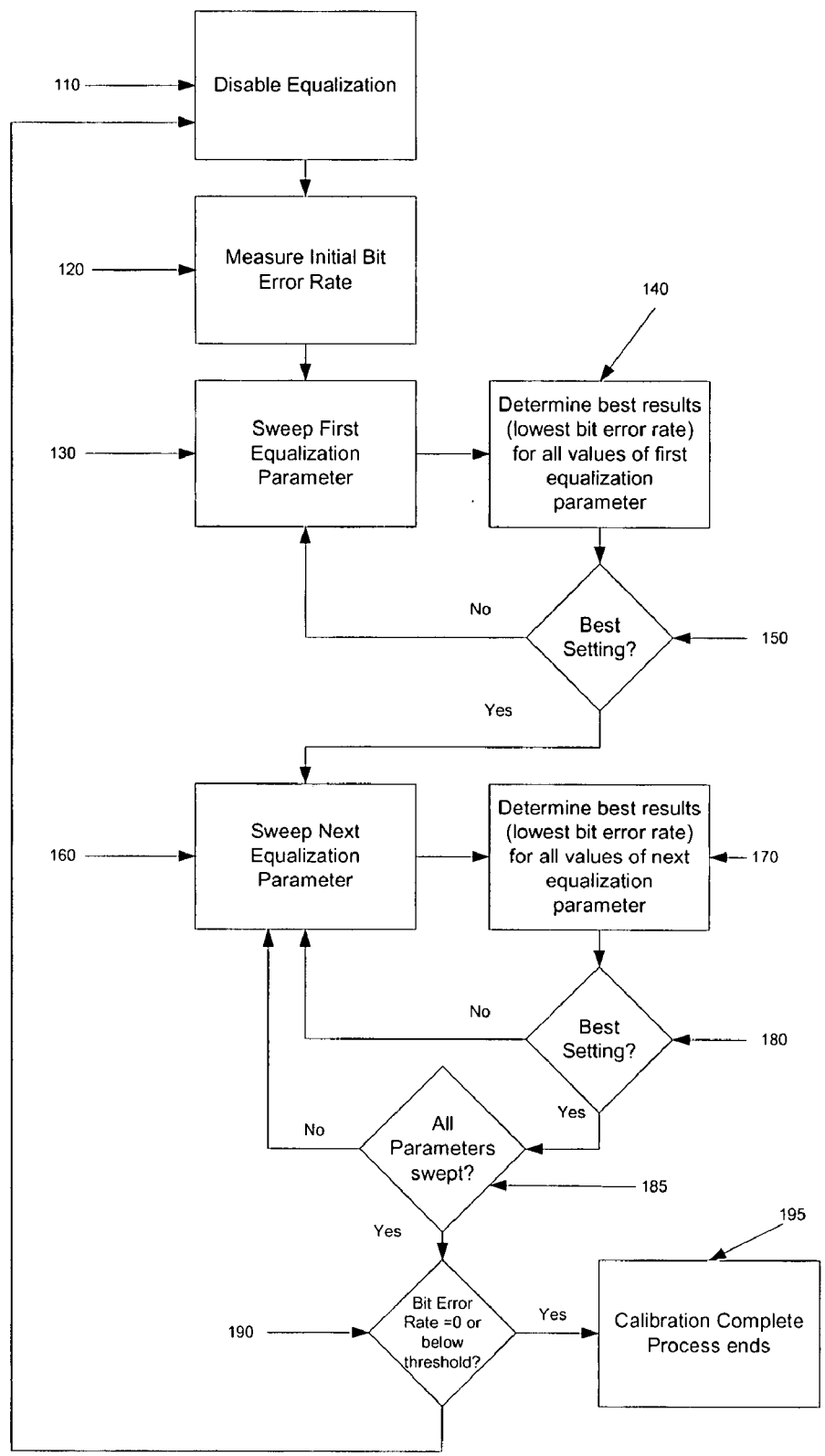
FIG. 1 is a flowchart diagram depicting processing in accordance with a preferred embodiment of the invention.

Referring first to FIG. 1, a calibration process begins by disabling all forms of equalization at step 110 and measuring an initial bit error rate at step 120. The bit error rate is calculated by adding the total number of running disparity errors and invalid 10 bit symbols within a preset time interval. Care must be taken to ensure that the equalization settings have been made, and any adjustments necessary to accept and adapt to those settings by the SerDes has settled prior to measuring the bit error rate.

The next step is to sweep one equalization parameter from its minimum to maximum value, and measure the bit error rate for each setting at step 130. Once the sweep is complete, the results of the sweep can be analyzed through software to make a decision about which setting provides the best results at step 140. If all of the equalization settings result in at least some errors, the setting which provides the lowest bit error rate will be chosen. If more than one setting provides a bit error rate of zero, and therefore, there is no best setting determined at step 150, processing can be returned to step 130, and the sweep can be redone with a longer time interval for measuring errors. By measuring the bit error rate for a longer period at each setting, the chance of catching bit errors for each setting increases. If there are still more than one setting that provide a zero bit error rate, the software must infer which setting provides the least chance of getting a bit error. After such processing has resulted in a determined best setting, the inquiry at step 150 will be answered in the affirmative and processing will continue to step 160.

At step 160, processing continues, and a next equalization parameter is swept, while the preferred setting for the first equalization parameter is maintained. As with the first parameter, a best setting (providing the lowest bit error rate) is determined for the second parameter at step 170. If all of the equalization settings result in at least some errors, the setting which provides the lowest bit error rate will be chosen. If more than one setting provides a bit error rate of zero, and therefore, there is no best setting determined at step 180, processing can be returned to step 160, and the sweep can be redone with a longer time interval for measuring errors. By measuring the bit error rate for a longer period at each setting, the chance of catching bit errors for each setting increases. If there are still more than one setting that provide a zero bit error rate, the software must infer which setting provides the least chance of getting a bit error. After such processing has resulted in a determined best setting, the inquiry at step 180 will be answered in the affirmative and processing will continue to step 185 where it is determined whether all parameters have been swept. If it is determined that not all parameters have been swept, processing will return to step 160 for sweeping of the next parameter. If processing on all parameters has been completed, then the inquiry at step 185 is answered in the affirmative and processing proceeds to the inquiry at step 190.

Therefore, in accordance with the invention, after sweeping each parameter, the best setting for that parameter is stored. Once all of the parameters have been swept a final measurement of bit error rate is determined at step 190 while using the preferred value chosen for each setting. If the bit error rate is zero (or below some predetermined threshold) for this final test, calibration is deemed successful, and these settings are saved and used for standard usage of the serial link and processing is completed at step 195. If the bit error rate is not zero, or below a predetermined threshold, the calibration process may be performed again, perhaps with consideration of the parameters in a different order if desirable. Processing therefore returns to step 110 when the inquiry at step 190 in answered in the negative.

At any point during use of the test system, if the characteristics of the communication channel change, the calibration scheme can be repeated, repeating all of the processing shown in FIG. 1.

Figure 2:
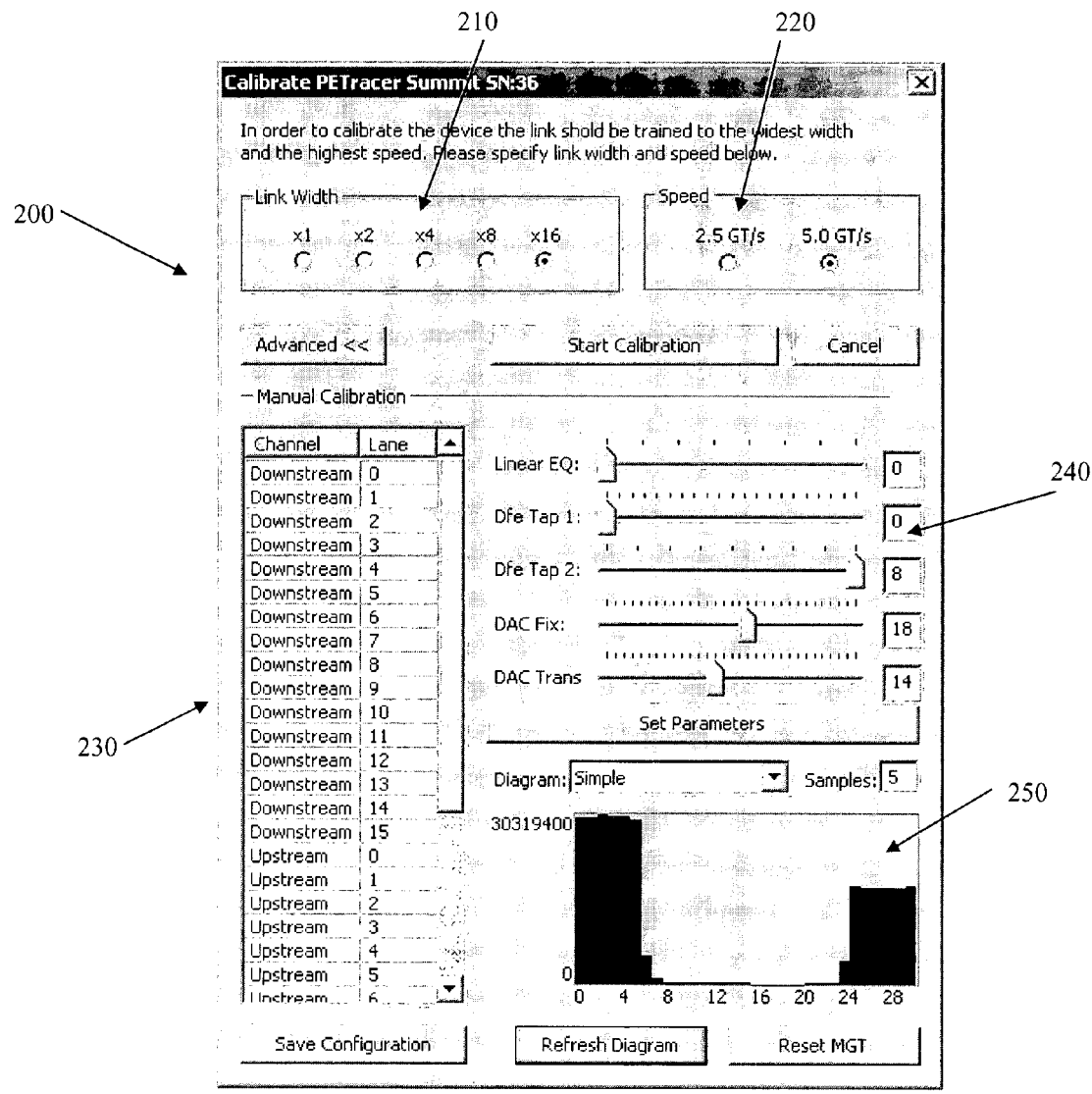
FIG. 2 is a screenshot depicting linear EQ settings Vs error density for downstream lane 2 in accordance with the invention.

FIG. 2 depicts a dialog box 200 provided in accordance with the present invention. Dialog box 200 further includes a link width selection 210 for indicating a number of lanes to be tested on a particular link, and a speed selection 220 for indicating the speed of the link. A manual link and direction selector 230 allows for the designation of a particular individual link, while settings 240 may be applied to manual calibration of any particular selected link at 230. A graph 250 is also included, and illustrates the effects of the SerDes phase setting to the bit error rate. The X axis of graph 250 shows the number of bit errors within a given time interval. The Y axis of graph 250 shows the phase setting (as an example of one of the parameters that may be determined in accordance with FIG. 1 noted above). As is shown, setting the phase with a value between 16 and 20 provides a zero bit error rate. Any of these four phase settings may be employed, and may be tested against the various settings of other parameters, such as linear EQ and DFE in accordance with the invention.

Figure 3:
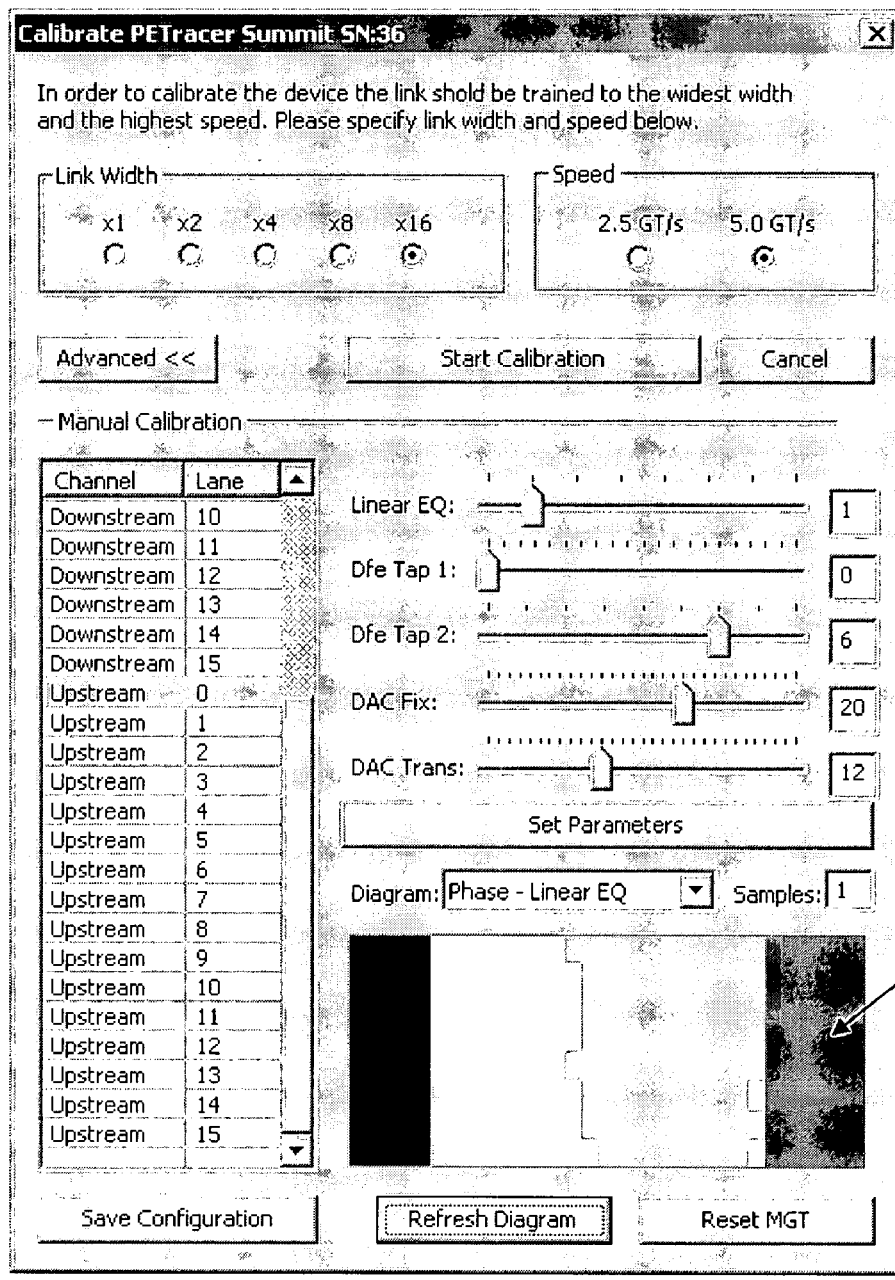
FIG. 3 is a screenshot depicting bit error rates by varying phase versus linear EQ settings.

Referring next to FIG. 3, a dialog box similar to that of FIG. 2 is shown, the difference being the display of a graph 350 which illustrates the variation of the phase opening versus the linear EQ setting. The X axis is the Linear EQ setting. The Y axis is the phase setting. The different defined areas represented for each sample shows the error rate. Some of the samples show an error rate of zero. Other of the samples have a positive error rate. Indications of the level of error rate may also be provided so that a higher error rate might be indicated with a darker grey scale, or a color change indicative of the error rate. Thus, in accordance with the invention the phase settings determined in FIG. 2 are used on one axis of a graph, and another parameter is plotted along the other axis to determine the best combination between the two.

Figure 4:
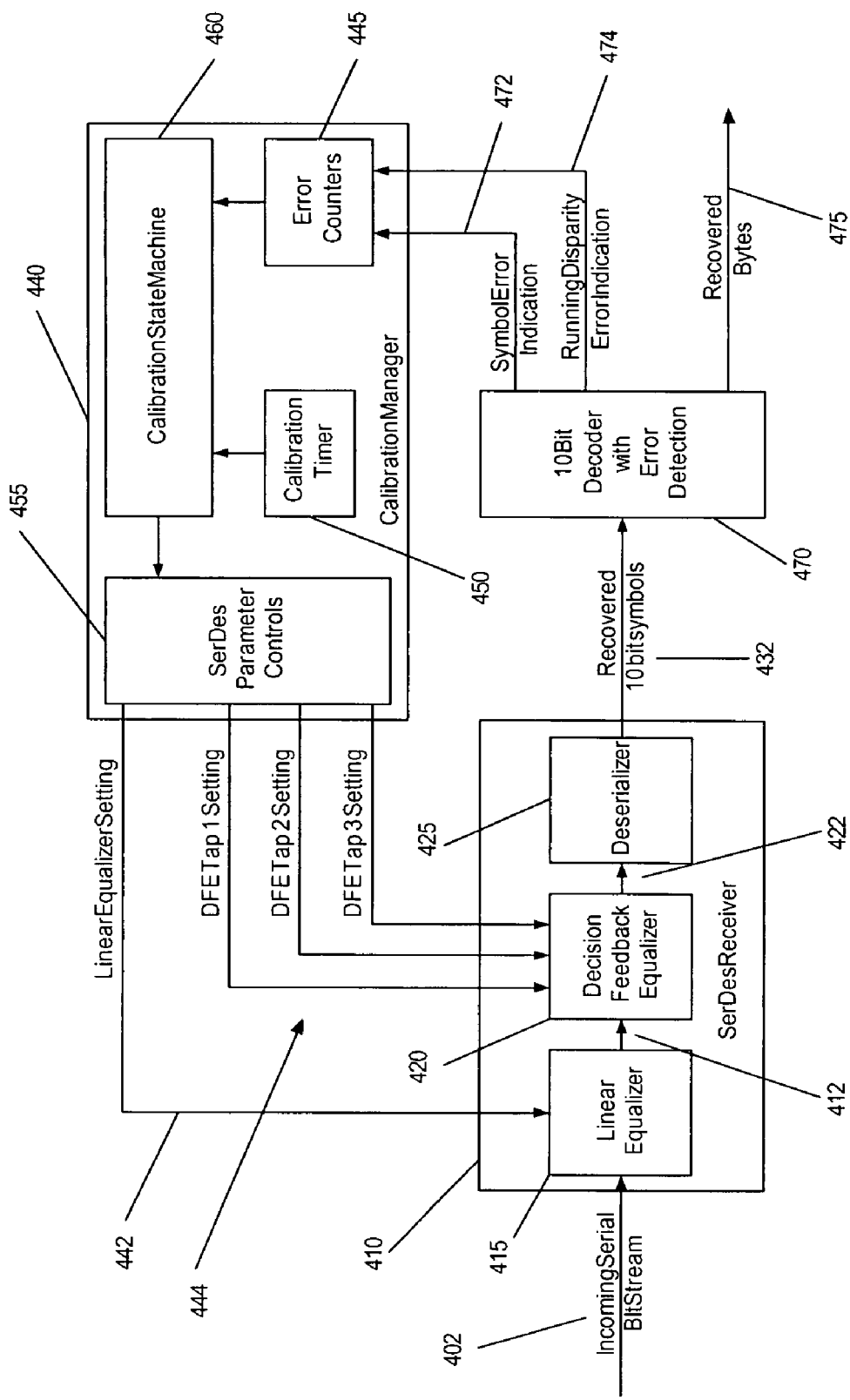
FIG. 4 is a block diagram of a calibration mechanism constructed in accordance with the invention.

Referring next to FIG. 4, a block diagram depicting an apparatus for implementing an embodiment of the present invention will be described. As is shown in FIG. 4, the apparatus comprises a SerDes Receiver 410, a Calibration Manager 440 and a 10 Bit Decoder with Error Detection 470. SerDes receiver 410 is further comprised of three components. The first component is a linear equalizer 415 which operates on an incoming bitstream signal 402 as it enters SerDes Receiver 410. Linear equalizer 415 is provided with one or more programmable settings which affect the amount of linear equalization that is applied to the incoming signal. The second component is a decision feedback equalizer (DFE) 420 which operates on the signal 412 after linear equalization is applied by linear equalizer 415. Decision feedback equalizer 420 is provided with one or more programmable settings which determine the amount of equalization applied to the signal. The third component of SerDes Receiver 410 is a deserialization circuit 425. The deserialization circuit takes signal 422 after the linear and DFE equalizations have been applied and converts the serial bitsream to a parallel bytestream 432. The parallel interface is typically 10 bits, 20 bits, or 40 bits which is comprised of 1, 2, or 4 10 bit symbols. The diagram in FIG. 4 shows the parallel interface as a 10 bit parallel interface.

As is further shown in FIG. 4, this parallel signal is then passed to a 10 bit decoder 470 which decodes the 10 bit encoded symbol to an 8 bit byte, and a K code indication, this information being output as recovered bytes 475. The K code indication is used to indicate the presence of a command code rather than a data byte. The 10 bit decoder also provides error detection using two means. The first means of error detection is through invalid running disparity (474) as defined by the 8 B/10 B decoding rules. The second form of error detection is through detection of invalid 10 bit codes (472) as defined by the 8 B/10 B decoding rules. These error measures are forwarded from 10 bit decoder 470 to calibration manager 440.

Calibration manager 440 is preferably comprised of 4 components. The first component comprises an Error counter 445 that counts the number of errors that have occurred during a predefined time interval, as received from 10 bit decoder 470 as error measures 472, 474. The second component is a calibration timer 450 that provides a time interval for which the error counter accumulates errors. The third component comprises a parameter controller 455 that controls various parameters of the SerDes, such as a linear Equalization setting, and one or more DFE Settings. Parameter controller 455 is in turn controlled by a calibration state machine 460 that manages the process of sweeping each equalization parameter and determining which parameters provide the best results for data recovery, and receives error counts and calibration timing from components 445, 450, respectively. These output parameters, for example linear equalizer setting 442 and DFE Tap settings 444 may in turn be fed back to SerDes receiver 410 for use in further processing.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed:

1. A method for calibrating an equalizer for an unknown communication channel without knowledge of the incoming signal, comprising the steps of:
   defining one or more equalization parameters;
   receiving a signal having an unknown data pattern over an unknown communication channel;
   calculating a bit error rate of the signal having the unknown data pattern for one or more values of a first of the one or more equalization parameters;
   setting a value for the first of the one or more equalization parameters which provides the lowest calculated bit error rate; and
   storing the set value for the one or more equalization parameters.

2. The method of claim 1, further comprising the steps of:
   calculating a bit error rate of the signal for one or more values of a next of the one or more equalization parameters;
   setting a value for the next of the one or more equalization parameters which provides the lowest bit error rate; and
   repeating the calculating and setting steps until values for all of the one or more equalization parameters have been set.

3. The method of claim 2, wherein the one or more equalization parameters are reordered and values are predetermined for each if a bit error rate below a predetermined threshold has not been achieved.

4. The method of claim 3, wherein the predetermined threshold is a bit error rate of approximately zero.

5. The method of claim 2, wherein the calculating and setting steps are repeated using a portion of the signal corresponding to a longer period of time when the initial calculating and setting steps result in more than one value of a particular equalization parameter that provides a zero bit error rate.

6. The method of claim 5, further comprising the step of utilizing additional predefined criteria to select between two values for a particular equalization parameter that provide a zero bit error rate.

7. The method of claim 1, wherein the signal has been encoded employing an encoding scheme that provides error detection capability through determination of incorrect running disparity.

8. The method of claim 1, wherein the signal has been encoded employing an encoding scheme that provides error detection capability through determination of the existence of invalid symbols.

9. The method of claim 1, wherein the signal has been encoded using an 8 b/10 b encoding scheme.

10. The method of claim 1, wherein the bit error rate is a relative bit error rate.

11. The method of claim 1, wherein the equalization parameters are selected from the group of phase setting, linear equalization, and decision feedback equalizer settings.

12. An apparatus for equalizing a signal, comprising:
   a receiver for receiving an incoming bitstream having an unknown data pattern over an unknown communication channel, the receiver further comprising:
      a linear equalizer for applying an equalization to the incoming serial bitstream in accordance with a linear equalizer setting;
      a decision feedback equalizer for further equalizing the incoming signal in accordance with one or more equalizer settings; and
   a deserializer for converting the serial bitstream to a parallel bytestream;
   a decoder for decoding the parallel bytestream and performing error detection processing thereon without knowledge of the incoming signal; and
   a calibration manager for managing at least the linear equalization settings and the decision feedback equalization settings, the calibration manager further comprising:
      an error counter for counting errors determined by the decoder;
      a timer for designating a time interval during which errors are counted;
      a parameter controller for controlling values assigned to each of one or more linear equalization and decision feedback equalization parameters; and
      a calibration state machine that modifies the values of the parameters controlled by the parameter controller.

13. The apparatus of claim 12, wherein the calibration state machine sweeps the values for each parameter from its minimum value to its maximum value.

14. The apparatus of claim 13, wherein a bit error rate is determined for each possible state of a first of the linear equalization and equalization parameters.

15. The apparatus of claim 14, wherein the parameter controller sets the value of the first of the linear equalization and equalization parameters in accordance with the state resulting in the lowest bit error rate.

16. The apparatus of claim 12, wherein the error counter counts running disparity errors.

17. The apparatus of claim 12, wherein the error counter counts symbol errors.

18. The apparatus of claim 12, wherein the incoming serial bitstream is encoded in accordance with an encoding scheme that provides error detection capability through determination of incorrect running disparity and through determination of the existence of invalid symbols.

19. The apparatus of claim 12, wherein the signal has been encoded using an 8 b/10 b encoding scheme.

20. A method for calibrating an equalizer for an unknown communication channel without knowledge of the incoming signal, comprising the steps of:
defining one or more equalization parameters;
receiving a signal having an unknown data pattern over an unknown communication channel;
calculating a bit error rate of a signal having an unknown data pattern without knowledge of the signal for one or more values of a first of the one or more equalization parameters by counting at least one of running disparity errors and incorrect symbol errors; and
setting a value for the first of the one or more equalization parameters which provides the lowest bit error rate.

21. The method of claim 20, further comprising the steps of:
calculating a bit error rate of the signal for one or more values of a next of the one or more equalization parameters by counting at least one of running disparity errors and incorrect symbol errors;
setting a value for the next of the one or more equalization parameters which provides the lowest bit error rate; and
repeating the calculating and setting steps until values for all of the one or more equalization parameters have been set.

* * * * *